Nov. 22, 1938.  C. F. DINLEY  2,137,479
DEGREASING APPARATUS
Filed July 8, 1937   3 Sheets-Sheet 2
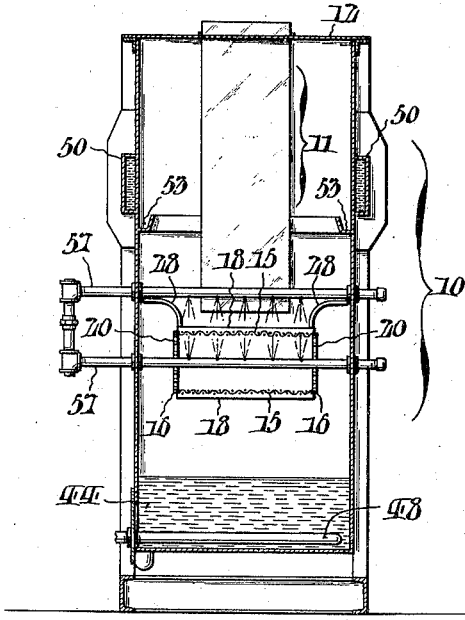
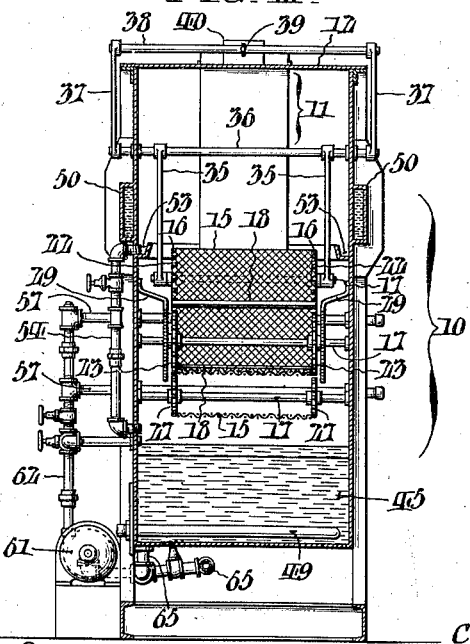
INVENTOR:
Clarence F. Dinley,
BY
ATTORNEYS.

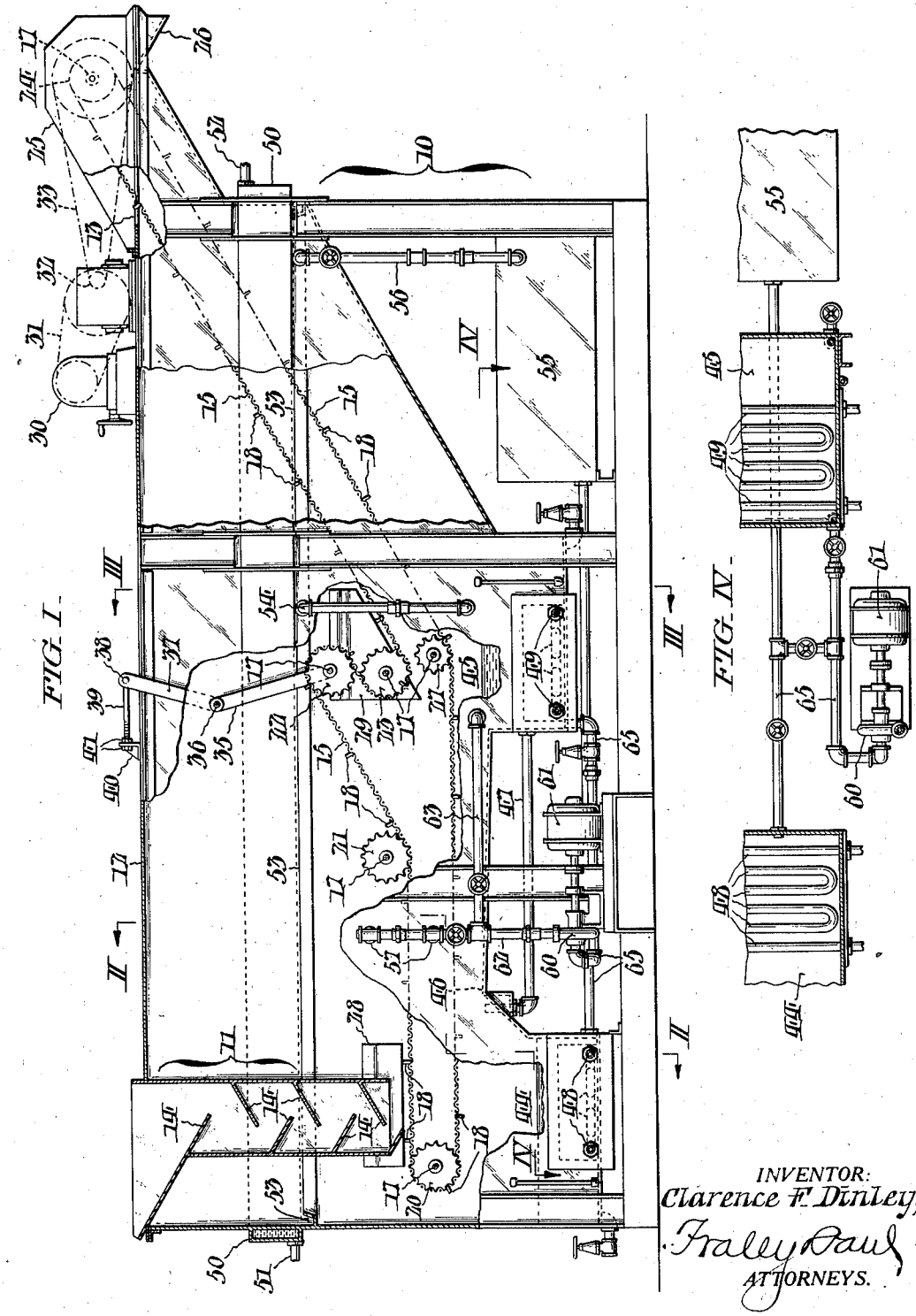

Nov. 22, 1938.  C. F. DINLEY  2,137,479
DEGREASING APPARATUS
Filed July 8, 1937  3 Sheets-Sheet 3
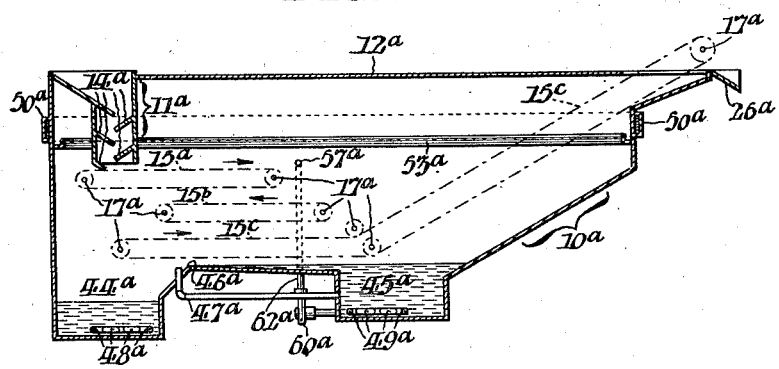
FIG. V.
WITNESSES:
INVENTOR:
Clarence F. Dinley,
BY
ATTORNEYS.

Patented Nov. 22, 1938

2,137,479

UNITED STATES PATENT OFFICE 2,137,479

DEGREASING APPARATUS

Clarence F. Dinley, Detroit, Mich., assignor, by mesne assignments, to Solvent Machine Company, Detroit, Mich., a corporation of Michigan, trustee Application July 8, 1937, Serial No. 152,520

5 Claims. (Cl. 87—6)

My invention relates to treatment with solvents for such purposes as cleaning and degreasing, and to the use of volatile solvents. Various solvents whose vapors are heavier than air may be used, such as benzine, benzol, and chlorinated solvents like carbon tetrachloride, trichloromethane, tetrachloromethane, dichlorethane, tetrachlorethane, trichlorethylene, and tetrachlorethylene, whose vapors are uninflammable. The articles or work to be cleaned may be treated with the liquid solvent or with the solvent vapor, or both, and in many cases, treatment with hot or even boiling liquid solvent is desirable. I aim at economizing solvent, and preventing or minimizing loss of its vapor from the treating vessel, even with the latter more or less open for the introduction and removal of work. The invention is especially adaptable and advantageous for cleaning quantities of small articles or pieces in bulk, and particularly hollow or cup-like objects, such as metal caps of various kinds. For this purpose, one or more traveling (belt or apron) conveyors may be employed, and provision may be made for tumbling or cascading the objects at one or more points in their travel, during or after their treatment with the solvent, so as to assure contact of the solvent with all surfaces of the articles, or to finally spill out any liquid solvent in the hollows of the work, or both. In suitable forms of embodiment, such as hereinafter described, my invention affords a compact and efficient machine, wherein large quantities of work can be rapidly, thoroughly, and economically cleaned of oil, grease, and dirt. Various other features and advantages of the invention will appear from the description hereinafter of species thereof, and from the drawings.

In the drawings, Fig. I is a side view of one form of apparatus suitable for the purposes of my invention, the main enclosure or treating vessel being for the most part shown in vertical section.

Figs. II and III show cross-sections through the apparatus, taken as indicated by the lines and arrows II—II and III—III in Fig. I.

Fig. IV is a fragmentary plan view, with certain parts in horizontal section as indicated by the line and arrows IV—IV in Fig. I.

Fig. V is a diagrammatic vertical longtudinal sectional view of another form of apparatus.

The apparatus shown in Fig. I comprises a sheet metal treating vessel 10 that contains the solvent, whether used as liquid or as vapor, and is closed to exclude air and retain any solvent vapor that may be present—purposely or incidentally— but is open or apertured at its upper portion, as hereinafter explained, for the introduction and removal of work. In the apparatus as illustrated, work is introduced at one end of the vessel 10 from above, through an upright chute or hopper 11 extending down through the top wall or roof 12 of the enclosure (see also Fig. II), and is withdrawn at the other end through another opening 13 in the roof 12. As shown in Fig. I, the chute 11 is of a cascade type, with a series of baffles 14 sloping inward and downward from its opposite sides, in alternation with one another. For carrying the work along through the enclosure, there is a conveyor system 15 of endless belt type, here shown as comprising wire mesh stretched between sprocket chains 16 which are trained around suitable sprockets on transverse shafts 17. At intervals along the belt 15, there are upstanding battens or cleats 18, to engage the work pieces.

In the present instance, the conveyor 15 with its chains 16 travels horizontally from left to right: viz., from a sprocket 20 under the lower end of the chute 11, and some distance beyond, under sprockets 21 and upward on a slope, reversely over and around sprockets 22 and abruptly down and back reentrantly underneath itself, and then under and around sprockets 23, and upward on a slope through the exit opening 13 in the roof 12, to and around sprockets 24 mounted between upward extensions 25 of the side walls of the enclosure 10—where the work may be discharged by gravity into an external chute 26. Doubling back around the sprockets 24, the conveyor 15 returns unloaded (and upside down), substantially parallel with its preceding sloping run, under and around sprockets 27, and then horizontally back to and around the sprockets 20. As shown in Fig. I, guard plates 28 at the sides of the conveyor 15 extend from the sprocket 20 a short distance past the chute 11, so as to prevent the loose objects emerging from the chute from falling off the edges of the conveyor while they are distributing themselves on it; and as shown in Fig. II, the upper portions of these guards 28 are bent to extend outward to the side walls of the casing 10. Similarly, as shown in Fig. I, there are guard plates 29 at the sides of the conveyor 15 in the region of the abrupt descent or cascade from the sprockets 22 to the sprockets 23, to prevent the objects there dropping or tumbling from the conveyor belt above the sprockets 22 on to the conveyor belt beyond the sprockets 23 from falling out at the sides of the conveyor.

As shown in Fig. I, the conveyor system 15 may be conveniently driven by power applied to the shaft 17 of the uppermost sprockets 24, as by means of an (electric) motor 30 mounted on the casing roof 12 which is connected through an adjustable-speed belt drive 31 to a reduction gearing 32, which is in turn connected by a belt or sprocket chain drive 33 to the said shaft 17. Fig. I also shows provision for adjusting the conveyor system 15 to keep its chains 16 properly taut. For this purpose, the shaft 17 of the sprockets 22 is mounted in bearings on crank arms 35 attached to a shaft 36 journaled in bearings on the side walls of the casing 10, and extending out through the latter. To the ends of this shaft 36 are fixed crank arms 37 whose upper ends are interconnected by a rod 38, and to this rod 38 there is pivotally connected a screw-threaded rod 39 that extends through a bracket 40 on the casing roof 12, and has adjusting nuts 41 threaded thereon. By adjusting these nuts 41, the arms 35 can be rocked either way, to take up slack in the sprocket chains 16, or to relax them if too taut.

In general, work is treated with liquid or vaporous solvent (or both) in the lower portion of the vessel 10, while its upper portion serves mainly to prevent or minimize loss of solvent vapor from the vessel, especially in drying the work after treatment with the solvent. For when the solvent employed is highly volatile light gasoline or benzine, or when the work is immersed in the solvent while itself still hot or warm, or when the solvent is used hot or even boiled during use, or when the solvent is purposely used in the vapor state, or when the work is allowed to drain or dry in the upper portion of the vessel after treatment with the solvent—in all such cases—solvent vapor will be present, and will tend to accumulate to the point of overflowing at the top opening. When the solvent is to be used hot—whether as liquid or as vapor—it may be heated (and vaporized) in the lower portion of the vessel by any suitable heating means there located. As shown in Fig. I, the vessel 10 has a plurality of distinct wells 44, 45, separated by a raised portion of the sheet metal forming the bottom of the vessel, which slopes from a crest 46 near the well 44 very gently to the right toward the well 45. However, the solvent in the well 45 may be limited to a lower level than crest 46, if desired, by an overflow pipe 47 extending from the well 45 across and up through the sloping portion of the bottom wall of the vessel between the crest 46 and the well 44, to any desired level below the crest 46. As shown, the wells 44, 45 are provided with heating means, such as steam piping 48, 49 near their bottoms, for heating, vaporizing, or even boiling the liquid solvent in either or both of them.

The escape of solvent vapor thus or otherwise present in the vessel 10 is prevented not so much by its top at 12, as by condensation of vapor from its upper portion. Loss of solvent vapor can be thus prevented or minimized by condensing the solvent vapor from or at a level substantially below the exit opening 13 and the top of the chute 11, and thereby limiting the accumulation of vapor in the vessel to its lower portion, below such level. Thus any vapor entering or arising in the draft-free upper portion of the vessel 10 will (being heavier than air) naturally gravitate into the lower portion of the vessel, without danger of escaping through the openings; and this upper portion of the vessel can be utilized to dry work after it has been treated with solvent in the lower portion of the vessel.

While the external atmospheric cooling of the upper portions of the vessel walls will condense vapor in it, yet generally it is preferable to supplement or (largely) replace atmospheric cooling with more effective cooling means, so that the vessel 10 need not be so deep as mere atmospheric cooling would require. The particular type and arrangement of cooling means—whether internal or external, and whether on one side, two or more sides, or all around the vessel 10—is broadly immaterial, except that the greater the extent of the cooling means perimetrically of the vessel, the less its extent vertically need be to give adequate exposed cooling area. The solvent vapor, being heavier than air, will always flow by gravity toward the region or area where it is most rapidly cooled and condensed, just as if there were an actual outlet for the vapor at such region. As shown in Fig. I, the vessel walls are (externally) waterjacketed at 50 all around the vessel, at a level above the sprocket 22 where the work is tumbled, and substantially above the lower end of the chute 11, but substantially below the roof 12. The jacket 50 has an inlet 51 for water or other cooling medium at its lower corner at one end of the vessel 10, and an outlet 52 at its upper corner at the other end of the vessel 10. The pure liquid solvent condensed by the cooling jacket 50 on the vessel walls runs down into a trough 53 that extends all around the vessel directly below the jacket, and from this trough it ordinarily drains into the well 45 through one or more valved pipes 54. On occasion, however, the pure solvent condensate from the trough 53 can be led away into a storage tank 55, under the upward-sloping bottom of the vessel 10 at the right, by means of a valved pipe 56. Ordinarily, the well 44 contains hot solvent which is kept hot or even boiled by the heating coil 48; the vessel 10 in general contains solvent vapor evolved from this well 44; and the well 45 contains cooler and purer condensed solvent from the trough 53. On occasion, however, the pure solvent in the well 45 can be boiled and vaporized by means of the heater 49, as explained more fully hereinafter.

The vessel 10 being filled with solvent vapor up to the level of the condenser 50, as already explained, work traveling to the right on the conveyor 15 will be cleaned by pure liquid solvent condensing directly on the work, by virtue of the fact that the entering work is ordinarily cooler than the boiling point of the solvent. As shown in Figs. I, III, and IV, however, provision is made for forcibly spraying the work on the conveyor 15 with liquid solvent, to wash off any dirt adhering to it, including even solid particles, or other dirt insoluble in the solvent. For this purpose, there are transverse perforated spray pipes 57, 57 extending across the vessel 10 above and below the conveyor 15, preferably at a point where solvent condensed on the entering work as above described has had a chance to soften and loosen the greasy dirt on the work. For supplying liquid solvent under effective pressure to the spray pipes 57, there is shown a (rotary, centrifugal) pump 60, driven directly by an (electric) motor 61. The valve-controlled delivery pipe 62 from the pump 60 is connected directly to the spray pipes 57,—with a valved branch 63 to the well 45 through which solvent can be delivered to this well when desired. As shown in Figs. I and IV, the suction-pipe 65 of the pump 60 has valve-controlled branches to both of the wells 44 and 45, as well as to the solvent storage tank 55. Thus the work on the conveyor 15 can at will be sprayed with (boiling) solvent from the well 44, or with pure (cool or hot) solvent from the well 45, or with solvent from the tank 55, or from any two or more of these sources together.

A mode of operation of the apparatus is as follows:

Small metal parts or other objects to be cleaned are put into the hopper mouth of the chute 14 in convenient batches, and descend by gravity to the belt 15, which carries them along between the cleats 18 through the solvent vapor and through the liquid solvent spray from the pipes 57, 57, which cleanses them thoroughly. The sprayed solvent runs off to the right into the well 45. Continuing to the right up the first inclined conveyor run, the parts drop or tumble at the sprockets 22 to the second inclined conveyor run, which carries them up out of the vessel at 13 and dumps them over the sprockets 24 into the external chute 26. When the objects first drop or tumble at the sprockets 22 as just described, any liquid solvent in their hollows is thrown against their internal surfaces that may not have been reached by the spray, and then spilled out, running down into the well 45, which also receives the pure solvent condensate from the trough 53. As the objects ascending on the conveyor 15 pass through the air in the upper portion of the vessel 10, along the vapor level maintained by the condenser 50, any liquid solvent on them dries off, and the vapors sink down into the lower portion of the vessel. Ordinarily, it will be preferred to spray the work with pure solvent from the well 45. Surplus pure solvent accumulating in well 45 overflows at 47 (or 46) into well 44.

When the solvent in one or both wells 44, 45 becomes too contaminated with oil, grease, or dirt for further use, the valve in pipe 54 is closed, that in pipe 56 is opened, pump 60 is stopped, and both heaters 48, 49 are used to boil the solvent, thus distilling it from both wells 44, 45 into the trough 53 and the tank 55, where the pure condensate is allowed to accumulate. When the wells 44, 45 have been boiled down nearly to dryness, steam is shut off from the heaters 48, 49, and the wells are thoroughly cleaned out. Then the pump 60 is operated to pump the pure solvent from the tank 55 back into well 45, whence part of it overflows into well 44. The valve in pipe 56 being now closed, the apparatus is ready for ordinary operation again.

Fig. V illustrates diagrammatically an apparatus generally similar to that shown in Figs. I–IV, but with different belt or apron conveyor arrangements. Only the main features are illustrated in this diagram. Instead of tumbling the work by abrupt descent of one conveyor, a plurality of separate conveyors are arranged one above another, so that work tumbles or cascades from an upper to a lower. As here shown, there are three such conveyors, 15a, 15b, 15c. The upper conveyor 15a receives work from an entrance chute 11, just as in Fig. I, carries it to the right, and tumbles it on to the subjacent conveyor 15b. The conveyor 15b carries the work to the left and tumbles it on to the subjacent conveyor 15c, which carries the work to the right and upward out of the enclosure 12, as in Fig. I. During the first tumble, the work is sprayed with solvent from the spray-pipe 57a, so that the solvent strikes each falling object from various angles, and washes all its surfaces. During the second tumble, any accumulation of liquid solvent that has been caught in the hollows of the articles in the spray or has drained into them is spilled out, so as not to be carried out of the apparatus by the conveyor 15c, on which solvent adhering to the articles dries off. Thus the work emerges perfectly clean and dry, and loss of solvent is avoided.

In Fig. V, as a means of dispensing with extended or repetitive description, various parts and features are marked with the same reference numerals as in Figs. I–IV, with an added "a", etc., where such distinction appears necessary.

Having thus described my invention, I claim:

1. Apparatus of the character described, for treating work consisting of articles or pieces in bulk with volatile solvent whose vapor is heavier than air, comprising in combination an elongated treating vessel or enclosure adapted to contain volatile liquid solvent and its vapor, and open for the exit of the work from its upper portion at one end thereof, a gravity chute or hopper extending down into the vessel at the other end thereof, for the introduction of work, cooling means for condensing solvent vapor in the vessel at a level substantially below the entrance and exit, and conveyor means for carrying the work along through the vapor in the vessel below the condensing level, part of said conveyor means overtraveling a subsequent part thereof, so as to tumble the solvent-bearing work.

2. Apparatus of the character described, for treating work consisting of articles or pieces in bulk with volatile solvent whose vapor is heavier than air, comprising in combination an elongated treating vessel or enclosure adapted to contain volatile liquid solvent and its vapor, and open for the exit of the work from its upper portion at one end thereof, a gravity chute or hopper extending down into the vessel at the other end thereof, for the introduction of work, cooling means for condensing solvent vapor in the vessel at a level substantially above the bottom of said chute, and a conveyor traveling under the lower end of said chute for receiving the work therefrom and carrying it along through the vapor in the vessel below the condensing level, and upward to the aforesaid exit at the other end of the vessel, said conveyor on its way descending abruptly, so as to tumble the articles on it.

3. Apparatus of the character described, for treating work consisting of articles or pieces in bulk with volatile solvent whose vapor is heavier than air, comprising in combination a treating vessel or enclosure adapted to contain volatile liquid solvent and its vapor, and open for the entrance and exit of work into and from its upper portion, cooling means for condensing solvent vapor in the vessel at a level substantially below the entrance and exit, conveyor means for carrying the work along through the vapor in the vessel below the condensing level, and means for spraying the work on the conveyor means with liquid solvent, part of said conveyor means overtraveling a subsequent part thereof adjacent the spray, so as to tumble the sprayed work.

4. Apparatus of the character described, for treating work consisting of articles or pieces in bulk with volatile solvent whose vapor is heavier than air, comprising in combination an elongated treating vessel or enclosure adapted to contain volatile liquid solvent and its vapor, and provided with means affording in said vessel separate wells for liquid solvent, and open for the entrance and exit of work into and from its upper portion, means for heating and vaporizing liquid solvent in one of said wells, cooling means for condensing solvent vapor in the vessel at a level substantially above said wells, with means for collecting the condensate and supplying it to the other of said wells, conveyor means for carrying the work along through the vapor in the vessel below the condensing level, and means for spraying the work on the conveyor means with liquid solvent from one of said wells, part of said conveyor means overtraveling a subsequent part thereof beyond the spray, so as to tumble the sprayed work.

5. Apparatus of the character described, for treating work consisting of articles or pieces in bulk with volatile solvent whose vapor is heavier than air, comprising in combination an elongated treating vessel or enclosure adapted to contain volatile liquid solvent and its vapor, and provided with means affording in said vessel separate wells for liquid solvent, and open for the exit of the work from its upper portion at one end thereof, a gravity chute or hopper extending down into the vessel at the other end thereof, for the introduction of work, means for heating and vaporizing liquid solvent in one of said wells, cooling means for condensing solvent vapor in the vessel at a level substantially above said wells and the bottom of said chute, with means for collecting the condensate and supplying it to the other of said wells, a conveyor traveling under the lower end of said chute for receiving the work therefrom and carrying it along through the vapor in the vessel below the condensing level and upward to the aforesaid exit at the other end of the vessel, said conveyor on its way descending abruptly, so as to tumble the articles on it, and means for spraying the work on said conveyor with liquid solvent from one of said wells during travel of the work from said chute to where it is tumbled as aforesaid.

CLARENCE F. DINLEY.